Feb. 24, 1931.  J. G. LEE  1,793,494
FOLDING WING AEROPLANE
Filed Nov. 13, 1928  2 Sheets-Sheet 1
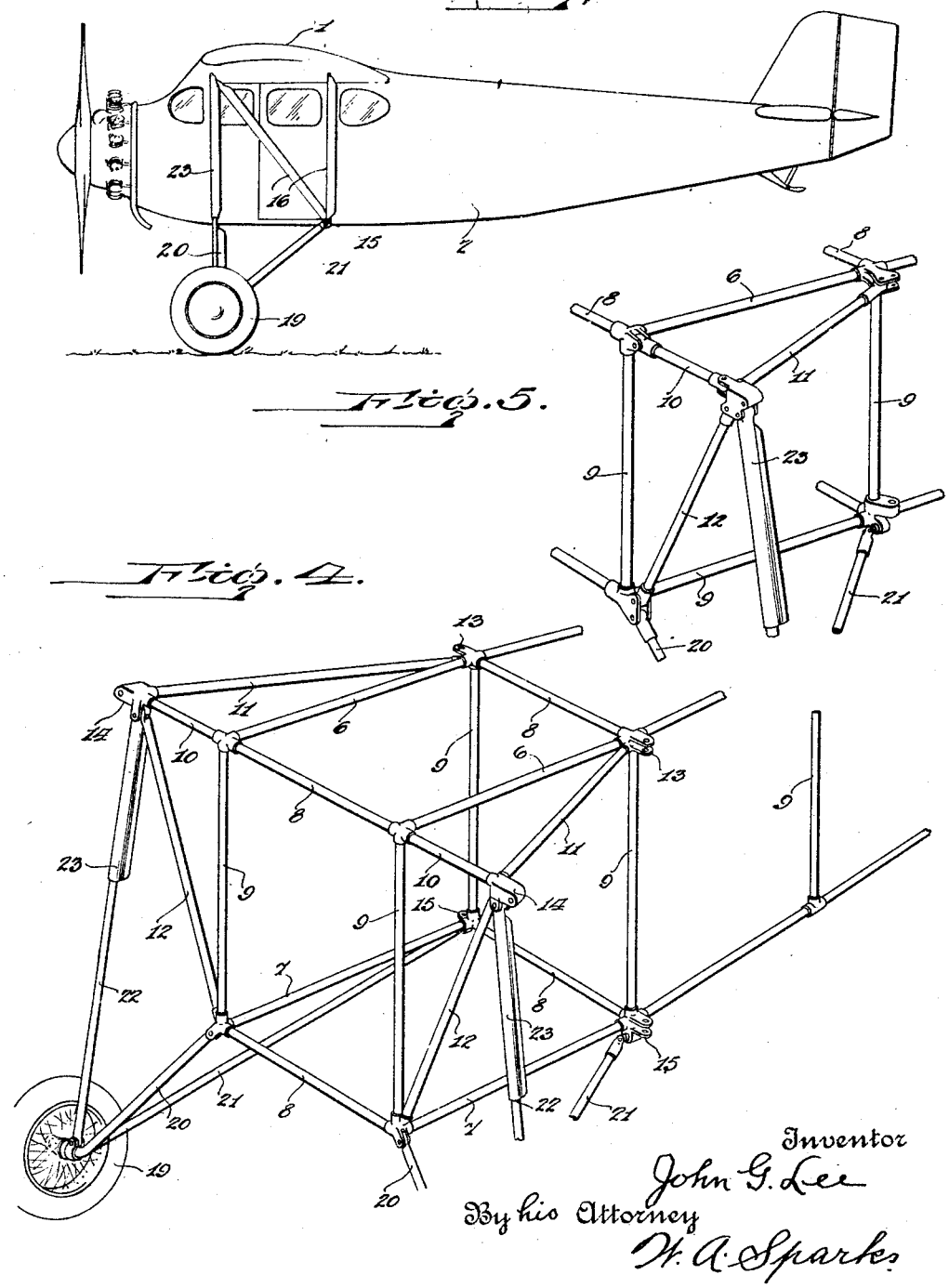
Inventor
John G. Lee
By his Attorney
W. A. Sparks

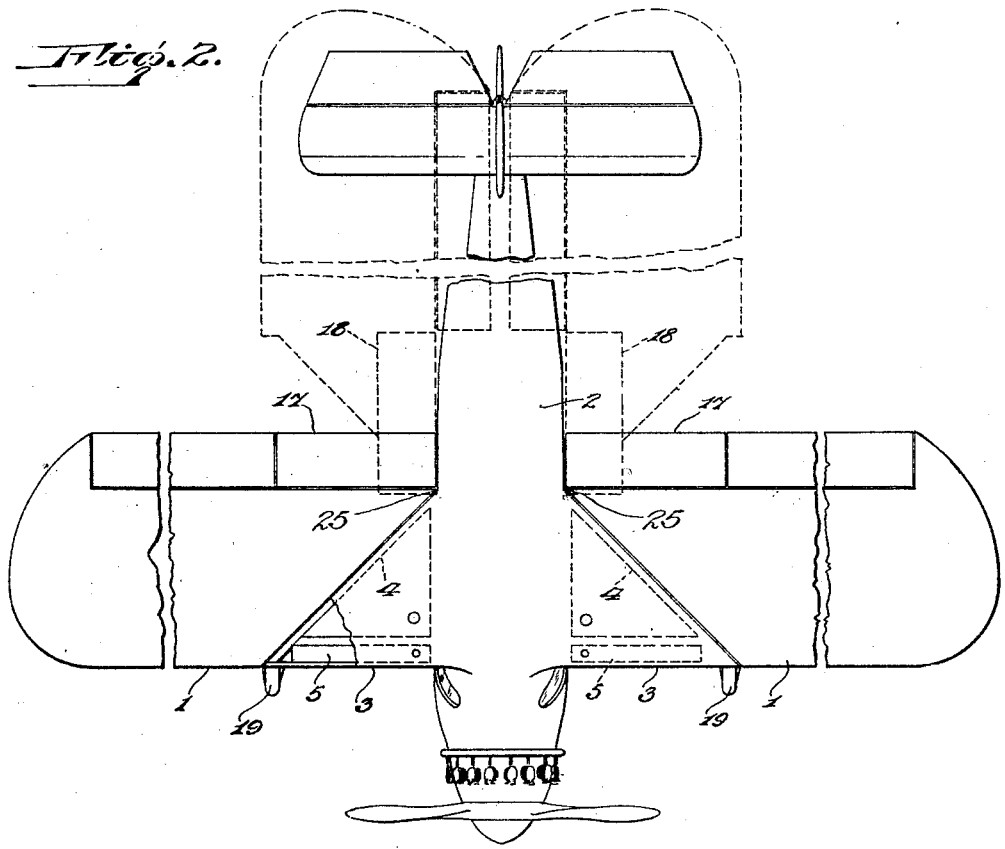
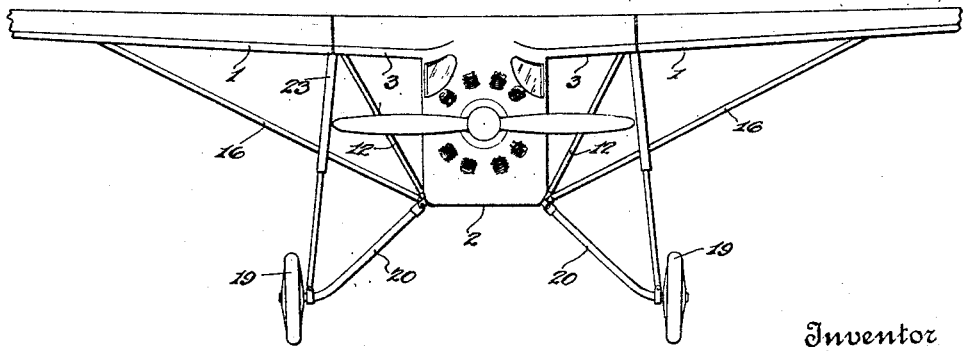

Patented Feb. 24, 1931

1,793,494

UNITED STATES PATENT OFFICE

JOHN G. LEE, OF AMITYVILLE, NEW YORK, ASSIGNOR TO FAIRCHILD AIRPLANE MANUFACTURING CORPORATION, OF FARMINGDALE, NEW YORK, A CORPORATION OF NEW YORK

FOLDING-WING AEROPLANE

Application filed November 13, 1928. Serial No. 319,033.

This invention relates to aeroplanes with folding wings and in particular to improvements in the construction of the frame.

An object of this invention is to provide an improved means for attaching the wings to aeroplanes in which the wings are adapted to be folded against the sides of the fuselage in order to prepare the aeroplane for storage or transportation or shipment.

Another object of the present invention is to provide an improved means for attaching the landing wheels to the aeroplane so as to provide a wide wheel tread in an aeroplane having folding wings.

In aeroplane construction it is desirable to provide means for folding the wings against the sides of the fuselage in order to make the aeroplane more compact for purposes of transportation, shipment or storage. In practice, it is the custom to mount the fuel tanks within the wings just adjacent the fuselage or above the occupants' heads. When the fuel tanks are filled the weight of the tanks and contents causes high stresses on the wing hinge in folding and throws an abnormal load on the rear portion of the fuselage due to the change in center of gravity. Inasmuch as an aeroplane in being handled for shipment or the like by the rear portion, this rearward shifting of weight upon folding the wings is highly objectionable. Further the fuel tanks if full produce warping stresses in the wings in transporting the airplane with the wings folded. Also the fuel tanks must have flexible free leads attached to them, and leaks in such leads are common and troublesome; while the placing of the fuel tank above the occupant's head is dangerous in case of fire or a crash.

Another object of the present invention is to provide a new and improved landing carriage and fuselage strutting in connection with folding wings.

Other objects and advantages of the present invention will become apparent from the following description, claims and appended drawings, in which:—

Fig. 1 is a side elevation of an aeroplane embodying the present invention.

Fig. 2 is a plan view showing the method of joining the wings to the fuselage.

Fig. 3 is a front elevation showing the arrangement of the landing gear and the struts supporting the wings, the dotted lines illustrating the position of the wings folded against the sides of the fuselage.

Fig. 4 is a view showing in perspective the forward portion of the fuselage frame and illustrates the construction and arrangement of the various parts of the portion of the frame to which the wings are attached.

Fig. 5 is a fragmentary view of a modified form of the invention in which the triangular sections of the fuselage are separable.

Like characters of reference refer to like parts in all views.

In order to simplify the drawings and avoid a long and unnecessary description the invention has been shown in the drawings as applied to an aeroplane of the monoplane type but it is to be distinctly understood that the invention is not limited to the precise type of machine shown but may be applied to other types as well such as a biplane or triplane.

The wings 1 are attached to the fuselage 2, Fig. 2, by means of a joint which is at a substantial angle instead of almost square as is the present practice. Adjacent the joint the fuselage frame is enlarged somewhat so as to form two substantially triangular projections 3 having a contour similar to the wing and within which the fuel tanks 4 may be mounted. If desired tanks 5 may be installed in front of the tanks 4 in order to utilize the space in the stub wings more fully.

The fuselage frame adjacent the portion to which the wings 1 and the landing gear are joined is constructed substantially as illustrated in Fig. 4, in which the numerals 6 and 7 represent the upper and lower longérons respectively. Cross struts 8 and vertical struts 9 form a box-like frame within which is supported the pilot's seat, luggage compartments and the seats for passengers. Projecting outwardly from the upper longérons 6 are short members 10 which may be formed as a prolongation of one of the cross struts 8. The members 10 are firmly braced by means of struts 11 and 12 which are joined to the longérons 6 and 7, respectively, at points where the longérons and the vertical and horizontal struts meet in a common joint. The whole object of this construction is to provide a strong and well braced structure to which the wings 1 and the landing gear may be attached.

Each wing is provided with a pivot member (not shown) which is adapted to fit within a pivot member 13 supported by the fuselage frame at the point where the longérons 6 and the struts 8, 9 and 11 meet in a common joint and is adapted to be firmly bolted or otherwise detachably connected to a member 14 formed as part of the joint where the members 10 and the struts 11 and 12 meet, thus adapting the wing to be pivoted at a point 25 as shown in Fig. 3. A second pivot member 15 is provided for each wing and is formed as part of the joint where the longérons 7 and the struts 8 are joined together. Each wing is firmly braced to the fuselage frame by means of struts 16 which are pivotally joined to the pivot member 15 and extend upwardly and outwardly to points on the outer portions of the wings. Thus the two wing struts move about their pivots 15 and the wing about its pivot 25. Any suitable latching device may be employed for holding the wing in extended position.

The wings 1 are so constructed that a portion of the rear or trailing edge 17 is adapted to be folded upwardly as at 18, Fig. 3, in order to permit the wings to be folded as close as possible to the sides of the fuselage.

The landing wheels 19 are supported by axle members 20 which are joined by means of a hinge pin to the under part of the fuselage frame where the longérons 7 and the struts 8, 9 and 12 meet. A second member 21 is attached to each member 20 and is also joined by means of a pin joint to the under side of the fuselage frame at the point where the longérons 7 and the struts 8, 9 and 16 meet in a common joint. Pivoted to the lower ends of the members 20 are members 22 which are adapted to slide within members 23 which are pivoted to the members 14. A suitable spring or other shock absorbing means carried within the members 23 serves as a shock absorber for the purpose of absorbing the shocks transmitted to the landing gear in landing operations. It is obvious that any desired shock absorbing strut construction may be employed in place of the members 22, 23 to connect the lower end of member 20 with the member 14.

The form of the invention shown in Figs. 1, 2, 3 and 4 in which members 10, 11 and 12 are shown as rigidly secured to the fuselage, is very satisfactory in smaller planes where the breadth of the plane with wings folded is not too great to permit the plane to be loaded in an ordinary box-car for shipment. But when larger sizes of planes are built embodying the invention, it is necessary to make the sections 3 separable from the fuselage proper and for this purpose, the members 10, 11 and 12 are bolted to the fuselage as shown in Fig. 5. This specific construction includes hinge pin connections for securing the members 10, 11 and 12 to the fuselage, and member 21 has its end portion bifurcated and pinned to the head of an eye-bolt secured in the connecting element or joint at the fuselage. With this construction, the stub-wings may readily be removed from a large plane so as to render it capable of shipment in the ordinary manner.

Various changes in the construction shown in the drawings may be made without departing from the spirit of the invention and I do not therefore desire to limit myself to the specific construction shown and described, but to interpret the invention broadly within the scope of the appended claims.

What I claim as my invention is:

1. In an aeroplane, having a fuselage, a stub wing extending laterally beyond said fuselage, a plurality of foldable lifting wings attached to said stub wing, and a landing gear, bracing means between said fuselage and said folding wings, between said fuselage and said stub wings, and shock absorbing bracing means between said landing gear and said stub wings.

2. In an aeroplane, a fuselage provided with upper front cross-braces extending laterally beyond the remainder thereof and braced from the upper and lower longérons by diagonal struts, stub wings attached to and supported by said fuselage structure, landing gear struts pivotally connected at spaced points on said lower longérons, shock-absorbing struts extending between and pivotally connected to said landing struts and to the outer extremities of said stub wing bracing structure, main wings pivotally connected to said stub wings and adapted to be folded alongside of said fuselage, wing struts extending from said fuselage to said main wings and pivotally connected to both.

3. In an aeroplane, a fuselage, stub wings connected to said fuselage, and bracing means extending from the upper and lower longérons to said stub wings for supporting the latter, a landing gear comprising pivotal landing struts connected to said fuselage and shock-absorbing struts pivotally connected to said landing struts and said stub wings.

4. In an aeroplane, a fuselage, stub wings connected to said fuselage, and bracing means extending from the upper and lower longérons to said stub wings for supporting the latter, a landing gear comprising pivotal landing struts connected to said fuselage and shock-absorbing struts pivotally connected to said landing struts and said stub wings, main wings pivotally connected to said stub wing and adapted to be folded alongside of said fuselage, wing struts pivotally connected to said fuselage and said main wings.

5. In an aeroplane, a fuselage, a stub wing of substantially triangular formation of diminishing area from front to rear, bracing means for said stub wing extending from and incorporated into the upper longérons of said fuselage, main supporting wings pivotally connected to said stub wing and adapted to be folded alongside of said fuselage, a landing gear comprising laterally pivotal landing struts connected to said fuselage, and shock-absorbing struts pivotally connected to said landing struts and said stub wings.

6. In an aeroplane, a fuselage, a stub wing of substantially triangular formation of diminishing area from front to rear, bracing means for said stub wing extending from and incorporated into the upper longérons of said fuselage, main supporting wings pivotally connected to said stub wing and adapted to be folded alongside of said fuselage, a landing gear comprising laterally pivotal landing struts connected to said fuselage, and shock-absorbing struts pivotally connected to said landing struts and said stub wings, said stub wing being additionally braced by diagonal compression members extending upwardly from said lower longéron.

In testimony whereof I affix my signature.

JOHN G. LEE.